US008229635B2

(12) United States Patent
Horii et al.

(10) Patent No.: US 8,229,635 B2
(45) Date of Patent: Jul. 24, 2012

(54) CONTROL DEVICE OF AUTOMATIC TRANSMISSION

(75) Inventors: Masaki Horii, Chiyoda-ku (JP); Shiro Yonezawa, Chiyoda-ku (JP); Takeru Okabe, Chiyoda-ku (JP); Osamu Ishikawa, Chiyoda-ku (JP); Tomohisa Shoda, Chiyoda-ku (JP); Nozomu Kamioka, Chiyoda-ku (JP); Yasufumi Ogawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 529 days.

(21) Appl. No.: 12/435,769

(22) Filed: May 5, 2009

(65) Prior Publication Data

US 2010/0125395 A1    May 20, 2010

(30) Foreign Application Priority Data

Nov. 20, 2008  (JP) ................. 2008-296953

(51) Int. Cl.
G06F 7/00 (2006.01)
G06F 17/00 (2006.01)
G06F 19/00 (2011.01)
(52) U.S. Cl. ........................................ 701/60
(58) Field of Classification Search ............ 701/51, 701/54, 58, 68, 52, 59, 60; 477/72, 76, 97, 477/98; 361/152; 180/337
See application file for complete search history.

(56) References Cited

U.S. PATENT DOCUMENTS

| 5,053,960 | A | * | 10/1991 | Brekkestran et al. | ........... 701/51 |
| 5,083,273 | A | * | 1/1992 | Nishiwaki et al. | ............... 701/68 |
| 6,401,016 | B1 | * | 6/2002 | Yoshino et al. | ................. 701/22 |

FOREIGN PATENT DOCUMENTS

| JP | 2005-151790 A | 6/2005 |
| JP | 2006-187155 A | 7/2006 |
| JP | 2007-177878 A | 7/2007 |

* cited by examiner

Primary Examiner — Mary Cheung
Assistant Examiner — Kyle K Tsui
(74) Attorney, Agent, or Firm — Sughrue Mion, PLLC

(57) ABSTRACT

A control device of a transmission is capable of instantaneously correcting a torque shortly after starting a motor, and properly correcting a gear operation shortly after starting (at transient time) even in case of coil temperature change. The device includes a gear change end determination unit, a motor stop determination unit, and a coil resistance estimation unit of estimating a coil resistance of the motor alternately by repeating at regular intervals a state of application of a predetermined voltage to the motor during stop before start of gear change and a state of no application; and when the motor is determined stop by the determination units, an initial value of a command voltage to be applied to the motor after start of gear change is corrected in a predetermined time period in accordance with a coil resistance value having been calculated by the coil resistance estimation unit.

6 Claims, 13 Drawing Sheets (A)

MOTOR COIL TEMPERATURE - MOTOR COIL RESISTANCE
CHARACTERISTICS (B)

MOTOR COIL RESISTANCE - MOTOR CURRENT
CHARACTERISTICS

THROTTLE OPENING - COIL RESISTANCE
ESTIMATING VOLTAGE APPLICATION INTERVAL
CHARACTERISTICS

CONTROL DEVICE OF AUTOMATIC TRANSMISSION

BACKGROUND OF THE INVENTION

1. Field of the Invention

The present invention relates to a control device of an automatic transmission to be mounted on vehicles.

2. Description of the Related Arts

As a conventional transmission control technique, the one of making gear change using a motor has been known. In such transmission control technique, an automatic manual transmission of twin clutch type is adopted, and in which a shift fork is operated by two motors to select a gear to which a power is transmitted, whereby gear change is conducted. (For example, refer to the Japanese Patent Publication (unexamined) No. 177878/2007)

Further, as a control technique of correcting a torque error accompanied by the temperature change of a permanent magnet of a permanent magnet-type electric rotating machine, torque correction control technique with temperature change of a motor is disclosed, for example, in the Japanese Patent Publication (unexamined) No. 187155/2006. In the torque correction control technique with temperature change of the motor disclosed in the Japanese Patent Publication (unexamined) No. 187155/2006, based on a motor revolution number and a torque command value, a current command value is obtained referring to a torque current conversion map indicating the relationship between a torque value, a motor revolution number and a current value that has preliminarily been prepared, this obtained current command value is converted to a voltage command value, and a voltage command value with respect to a command torque is calculated.

Additionally, based on the mentioned torque command value, and referring to a torque voltage conversion map indicating the relationship between a torque value, a motor revolution number and a voltage value, a corrected voltage command value with respect to a command torque is calculated, a resistance change is calculated from a voltage difference between the voltage command value with respect to the mentioned command torque and the corrected voltage command value with respect to the mentioned command torque, further the amount of change of a current value is obtained from this resistance change, and letting this current change value a current correction value, a torque error is corrected.

Furthermore, as a conventional technique of calculating a coil resistance of a motor, a coil resistance calculation technique of a motor is disclosed, for example, in the Japanese Patent Publication (unexamined) No. 151790/2005. In this coil resistance calculation technique of a motor, when the motor is stopped, the same duty is held at least for not less than 0.5 seconds so as to prevent the rotation of the motor, thereby carrying a DC, a coil resistance is calculated from the electric current and the voltage of the motor, and from this calculated coil resistance, a coil temperature is estimated using resistance temperature characteristics of a coil.

SUMMARY OF THE INVENTION

In the conventional transmission of making gear change utilizing any motor, electric current flows through the motor every time gear change is repeated and a coil temperature rises, so that a coil resistance of the motor is increased, and thus an actual torque of the motor is decreased not to satisfy a target torque. In this case, for example, since in an automatic transmission, a sufficient target torque cannot be obtained at the time of the start of gear change, a problem exists in that the time taken for a gear of the transmission to be in the connected state becomes longer, or that the gear is not connected.

Furthermore, in the case of employing the conventional control technique of correcting a torque error accompanied by the temperature change of a motor in the transmission control device, since no correction of a command current is conducted except when the motor is generating a torque, command current correction immediately after starting to drive the motor is delayed, and the torque shortly after starting to drive is not an optimum value with respect to the target torque depending on the temperature state of the motor. FIG. 12 shows details of command current correction situations with respect to the motor in this case. In the drawing, (A) shows the relationship between a command current and an actual current, (B) shows the relationship between a target torque and an actual torque, and (C) shows execution situations of command current correction operation.

With reference to FIG. 12, no command current correction operation is conducted before torque generation (before current command), and command current correction operation is conducted after torque generation, so that there are produced delays in correction of the command current, and the response of the actual torque with respect to the target torque shortly after starting to drive is poor. In this case, for example, electric current is unlikely to flow through a coil when the coil temperature is high before starting to drive the motor, the torque shortly after starting to drive does not satisfy the target torque, and the response delay is generated in gear operation shortly after the torque command (current command). Moreover, since the electric current is likely to flow in the case that the coil temperature is low before starting to drive the motor, another problem exists in that the torque shortly after starting to drive exceeds the target torque, and damages the gear.

Further, in the conventional transmission of making gear change employing the motor, since the motor generates a counter electromotive force at the time of driving the motor, the power source voltage of the motor is affected by the mentioned counter electromotive force, and the voltage across terminals of the motor is varied. Further, since the mentioned counter electromotive force depends on the rotation speed of the motor, when the rotation speed of the mentioned motor is significantly varied, fluctuations in the voltage across the terminals of the mentioned motor comes to be large. Thus, when the rotation speed of the motor is considerably varied at the time of driving the motor, correction of the voltage across the terminals of the mentioned motor is delayed, adversely affecting the gear change response. For example, when shifting of gear change range of the transmission is quick, a further problem exists in that fluctuations in the rotation speed of the motor for use in shifting of the mentioned gear change range becomes large, the correction of the voltage across the terminals of the mentioned motor is delayed, following characteristics of the actual torque with respect to the target torque comes to be worse, and the gear is not connected.

Furthermore, in the conventional transmission, since inrush current of much spiking electric current flowing temporarily is generated at the time of command torque input of the motor, in the case of correcting the command voltage of the motor from the start of operation, the correction of the command voltage cannot be exactly conducted under influences of this inrush current. Therefore, a further problem exists in that following characteristics of the actual torque with respect to the command torque is delayed, and that the time taken for the gear of the transmission to be in the connected state becomes long, or the gear is not connected.

Moreover, in the conventional transmission of making gear change employing the motor, since the electric current for calculating a coil resistance is carried for a long time through the motor when the motor is stopped, the power consumption is increased. For example, in the case that the gear change frequency is low in the automatic transmission, as a result of increased stop time of the motor, a further problem exists in the increase of the power consumption. In the above-mentioned case, although the coil temperature is estimated with the use of resistance temperature characteristics from the coil resistance having been calculated when the motor is stopped, no correction of a torque is conducted using this estimated coil temperature. In this case, for example, in the case of high gear change frequency in the automatic transmission, a time period of the motor being driven becomes long, so that the coil temperature is increased. However, since no torque correction is conducted, a further problem exits in that the actual torque does not satisfy the target torque using temperature characteristics of a coil.

Accordingly, the present invention has an object of providing a control device of a transmission with which the delay of torque generation shortly after starting to drive the motor can be instantaneously corrected, and which can make such a control that the torque shortly after starting to drive is the optimum value with respect to a target torque in accordance with the temperature state of the motor.

A control device of an automatic transmission according to the invention is provided with an engine, an automatic transmission including a clutch for transmitting a power from the mentioned engine to a gear change mechanism part, gear change control means of controlling gear change of the mentioned automatic transmission, and a motor changing a gear range of the mentioned automatic transmission based on a gear change command from the mentioned gear change control means. This control device of an automatic transmission further includes: gear change end determination means of determining that gear change of the mentioned automatic transmission is ended; motor stop determination means of determining that the mentioned motor is stopped; and coil resistance estimation means of estimating a coil resistance of the mentioned motor in which a state of application of a predetermined voltage to the motor during stop of the motor before the start of gear change and a state of no application thereof are alternately repeated at regular intervals. In this control device, in the case that the motor is determined stop by the mentioned gear change end determination means and motor stop determination means, during stop of the motor before the start of gear change, an initial value of a command voltage to be applied to the mentioned motor after the start of gear change is corrected in a predetermined time period in accordance with a coil resistance value having been calculated by the mentioned coil resistance estimation means.

In the control device of a transmission according to the present invention, since a command voltage is corrected using a coil resistance estimation value having been calculated just before starting to drive the motor, the torque shortly after starting to drive the motor can be instantaneously corrected, and gear operation shortly after starting to drive (at transient time) can properly be corrected even if the coil temperature is varied.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

A first embodiment according to the present invention is hereinafter described referring to FIGS. 1 through 8.

Figure 1:
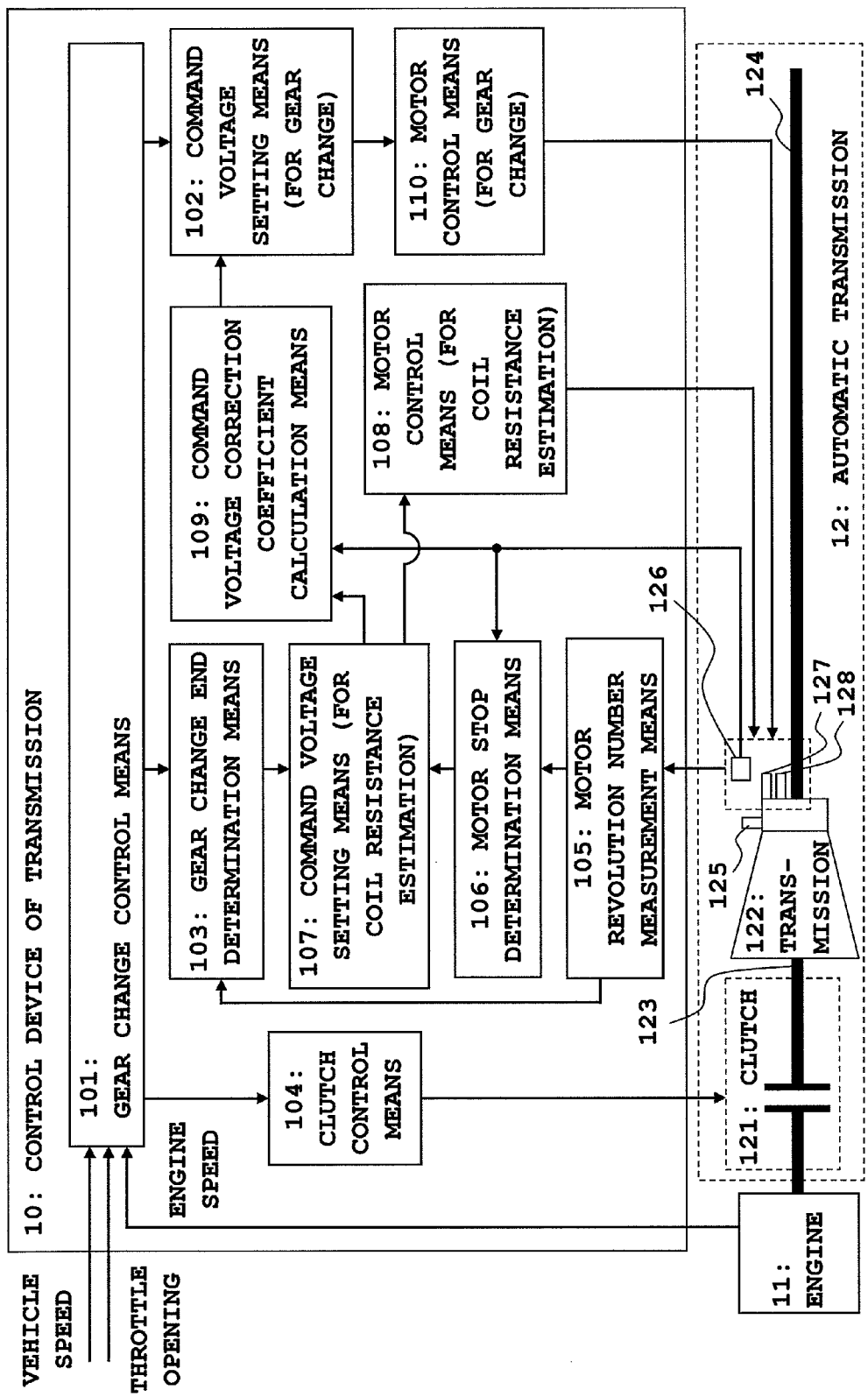
FIG. 1 is a schematic diagram showing an arrangement of a control device of a transmission according to a first embodiment of the present invention.

FIG. 1 is a schematic diagram showing an arrangement of a control device of a transmission according to the invention. With reference to FIG. 1, reference numeral 10 designates a control device of a transmission according to the present invention, and numeral 11 designates an engine, and numeral 12 designates an automatic transmission. The automatic transmission 12 is made up of a clutch 121 for making a power transmission from the engine 11, a transmission 122 for changing a gear range of the automatic transmission, an input shaft to the transmission 123, an output shaft 124 from the transmission, gear change means 125 for making gear change, and a current measurement sensor 126 for measuring an electric current flowing in the case that a voltage is applied to a motor.

The mentioned automatic transmission 12 is an automatic manual transmission constructed so as to make gear change using an actuator, and is in construction of shifting a gear range through the gear change means 125 using a motor (for shift) 127 (hereinafter, it is referred to as a motor for shift) operating the gear change lever in a shift direction, and a motor (for select) 128 (hereinafter, it is referred to as a motor for select) operating the gear change lever in a select direction.

In addition, the control device 10 of the transmission being a subject matter of the invention is provided with gear change control means 101. This gear change control means 101 determines a gear range depending on an operation state such as a vehicle speed, an engine speed and a throttle opening, and provides a command of gear change to command voltage setting means (for gear change) 102 and gear change end determination means 103, as well as makes a gear change instruction of controlling the engagement and the release of a clutch to clutch control means 104. Reference numeral 105 designates motor revolution number measurement means of measuring the number of revolutions of the mentioned motor for shift 127 or the mentioned motor for select 128.

In the case that the number of revolutions that is detected at the mentioned motor revolution number measurement means 105 is not more than a predetermined value and there is no gear change instruction from the mentioned gear change control means 101, the above-mentioned gear change end determination means 103 determines that gear change is ended.

Further, numeral 106 designates motor stop determination means of determining that the mentioned motor for shift 127 or the mentioned motor for select 128 is stopped in the case that the number of revolutions that is detected at the mentioned motor revolution number measurement means 105 is not more than a predetermined value, and the current detected value at the mentioned current measurement sensor 126 is not more than a predetermined value.

Numeral 107 designates command voltage setting means (for coil resistance estimation) for setting a coil resistance estimating voltage in the case of inputting the determination result that gear change is ended and the motor is stopped from the mentioned gear change end determination means 103 and motor stop determination means 106. Numeral 108 designates motor control means (for coil resistance estimation) of applying a coil resistance estimating voltage that is set at the mentioned command voltage setting means (for coil resistance estimation) 107 to the mentioned motor for shift 127 or the mentioned motor for select 128.

Numeral 109 designates command voltage correction coefficient calculation means for calculating a coil resistance estimation value in accordance with the mentioned coil resistance estimating voltage that is applied to the mentioned motor for shift 127 or the mentioned motor for select 128 and an electric current flowing through the mentioned motor for shift 127 or the mentioned motor for select 128 that is measured at the mentioned current measurement sensor 126 at the time of application of the coil resistance estimating voltage, and calculating a command voltage correction coefficient in accordance with the coil resistance value at room temperature having preliminarily been set and the mentioned coil resistance estimation value.

The mentioned command voltage setting means (for gear change) 102, in the case that gear change instruction is present from the mentioned gear change control means 101, leads out a command voltage in accordance with a vehicle speed or an engine speed, and by multiplying the mentioned command voltage by the command voltage correction efficient having been calculated at the mentioned command voltage correction efficient calculation means 109, calculates a command voltage after correction with changes in a coil resistance value due to the change of a coil temperature. Numeral 110 designates motor control means (for gear change) for driving the mentioned motor for shift 127 or the mentioned motor for select 128 in accordance with the command voltage after correction to be calculated at the mentioned command voltage setting means (for gear change) 102. Incidentally, correction of the command voltage is to be conducted within a predetermined time period.

Figure 2:
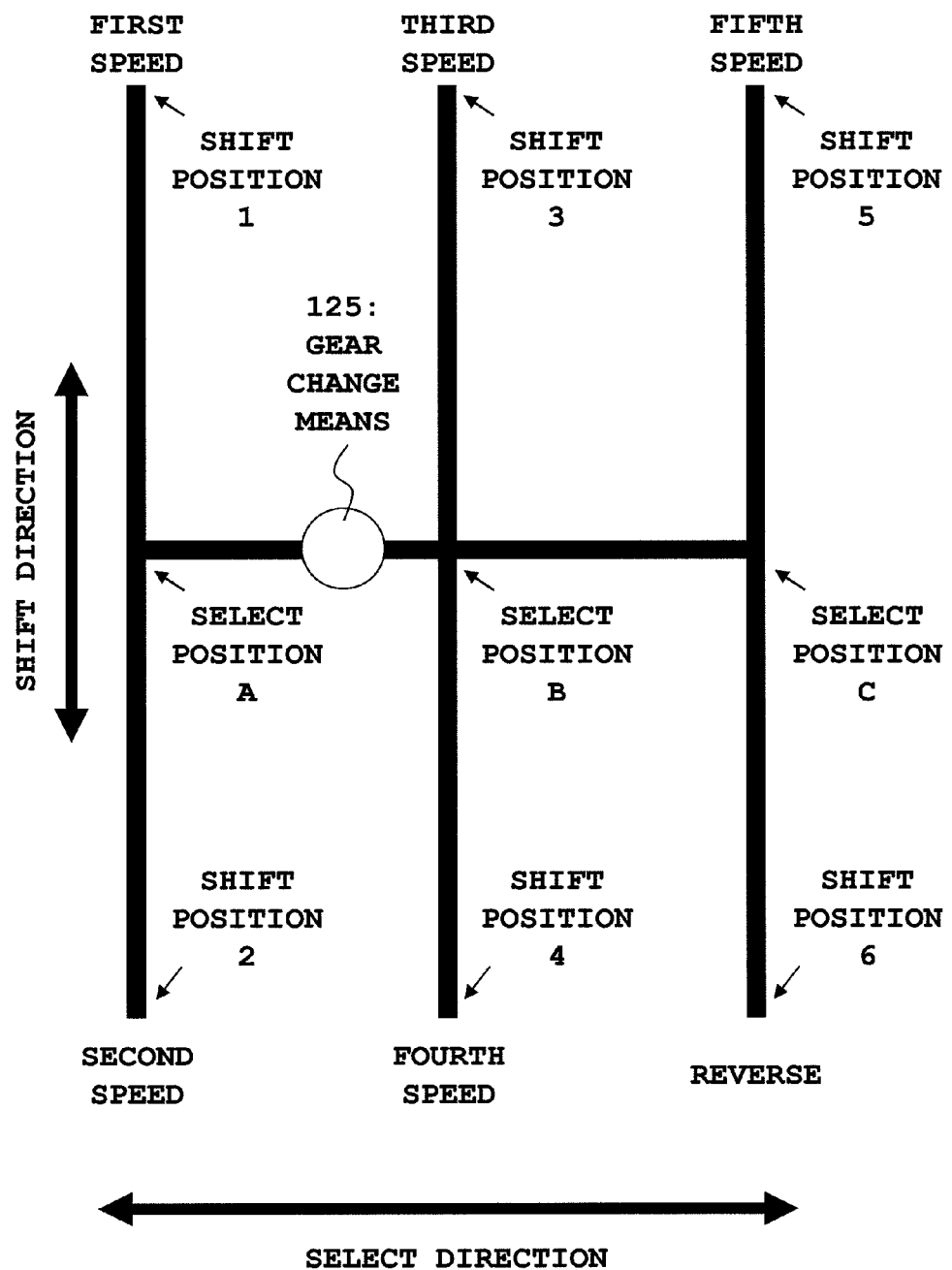
FIG. 2 is a diagram of explaining operations of gear change means illustrated in FIG. 1.

Now, details of the gear change lever are described with reference to FIG. 2. FIG. 2 is a diagram of explaining operations of gear change means 125 illustrated in FIG. 1. Referring to FIG. 2, shifting of a gear range in the transmission 122 is hereinafter described. When shifting a gear range, the gear change means 125 is moved by the motor for shift 127 and the motor for select 128 to make gear change. In the drawing, each of a shift position 1 to a shift position 6 is selected depending on shift direction, and each of a select position A to a select position C is selected depending on select direction.

In the case that the gear change means 125 is moved to the shift position 1, a first speed gear is engaged; in the case that the gear change means 125 is moved to the shift position 2, a second gear is engaged; in the case that the gear change means 125 is moved to the shift position 3, a third gear is engaged; in the case that the gear change means 125 is moved to the shift position 4, a fourth gear is engaged; in the case that the gear change means 125 is moved to the shift position 5, a fifth gear is engaged; and in the case that the gear change means 125 is moved to the shift position 6, a reverse gear is engaged. Additionally, in the case that the gear change means 125 is moved to the select position A, B or C, it is brought in a neutral state.

Figure 3:
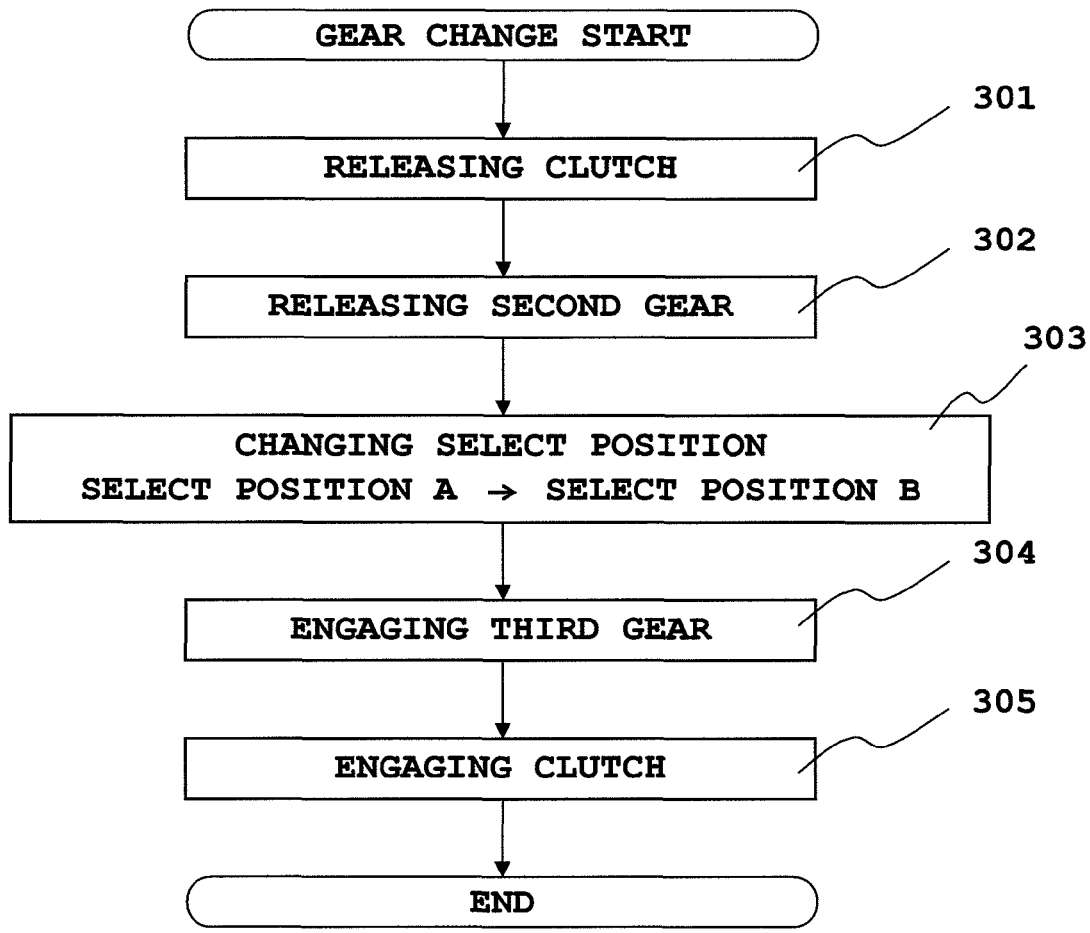
FIG. 3 is a flowchart showing the procedure of the case of making gear change from the second speed to the third speed.

Now, details of gear change are described using a flowchart of FIG. 3. FIG. 3, letting an initial position of the gear change means 125 illustrated in FIG. 2 the shift position 2, shows the procedure of the case of gear change from the second speed to the third speed. The instruction of gear change is inputted from the gear change control means 101 illustrated in FIG. 1, and the following steps are conducted.

In Step 301, the clutch is released by the clutch control means 104 illustrated in FIG. 1.

In Step 302, upon the gear change instruction from the gear change control means 101 illustrated in FIG. 1, the gear change means 125 that is at the shift position 2 illustrated in FIG. 2 is driven by the motor for shift 127 and moved to the select position A, to release the second gear.

In Step 303, upon the gear change instruction from the gear change control means 101 illustrated in FIG. 1, the gear change means 125 that is at the select position A illustrated in FIG. 2 is driven by the motor for select 128 and moved to the select position B.

In Step 304, upon the gear change instruction from the gear change control means 101 illustrated in FIG. 1, the gear change means 125 that is at the select position B illustrated in FIG. 2 is driven by the motor for shift 127 and moved to the shift position 3, thereby to be engaged with the third speed gear.

In Step 305, the clutch is brought in engagement upon the instruction from the clutch control means 104 illustrated in FIG. 1, whereby gear change has completed.

Figure 4:
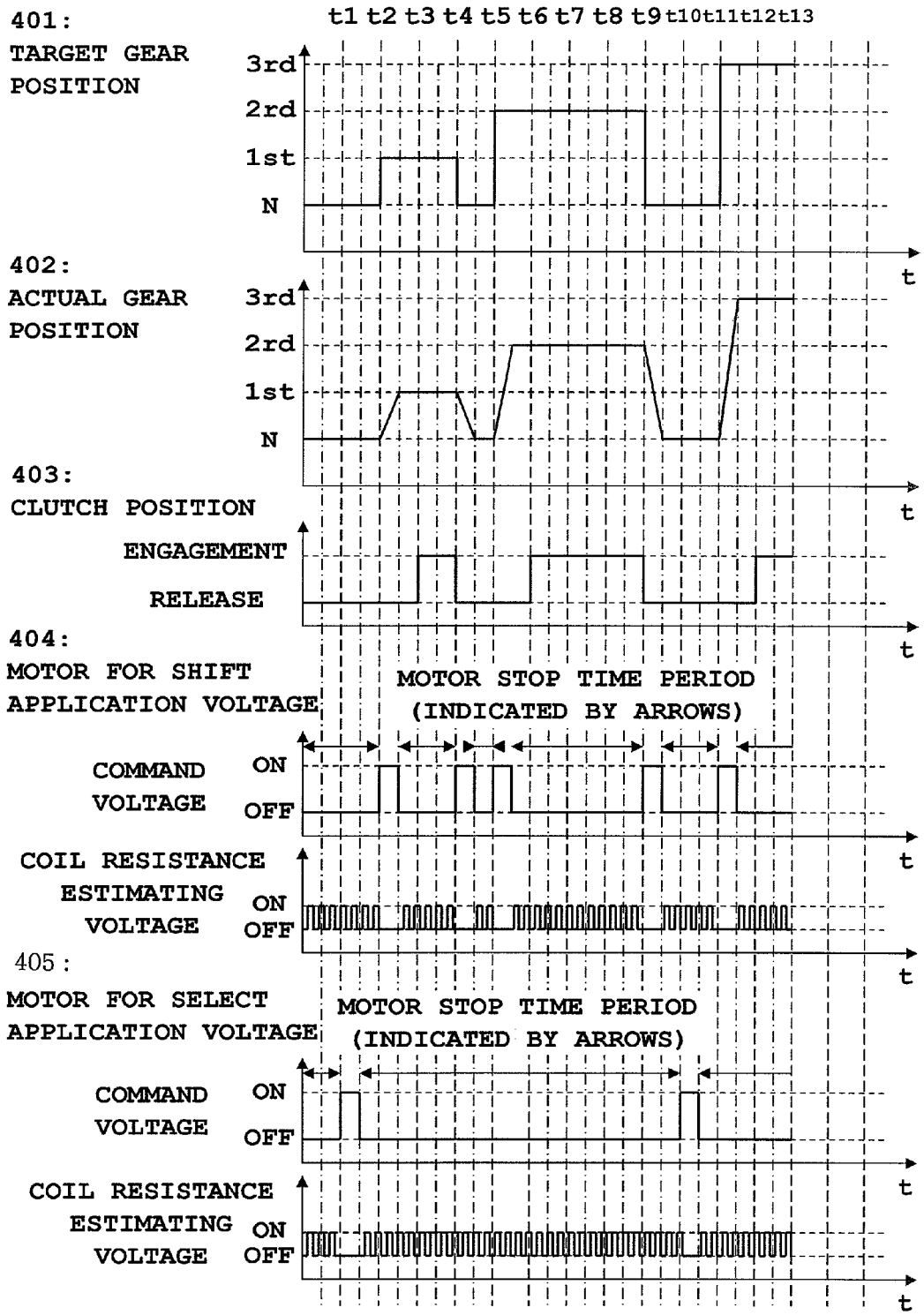
FIG. 4 is a diagram showing timing charts at the time of gear change in the first embodiment of the invention.

FIG. 4 is a diagram showing timing charts at the time of gear change in the first embodiment of the invention. In the drawing, numeral 401 is a target gear position, and shows the case in which letting an initial position the state that a gear is released (hereinafter, it is N range), gear range is increased one after another. Numeral 402 is an actual gear position, and shows the state that the gear is engaged or released with respect to the target gear position. Numeral 403 shows a clutch state (engaged or released). Numeral 404 shows a shift motor command voltage and numeral 405 shows a select motor command voltage.

In the mentioned numerals 404 and 405, timings of applying the command voltage at the time of gear change and the coil resistance estimating voltage are shown. The command voltage is applied to the motor at the time of gear change by the motor control means (for gear change) 110; and during a time period when no command voltage is applied to the motor by the mentioned motor control means (for gear change) 110 (in the drawing, it is OFF time), that is, when the motor is stopped, the state of application of the coil resistance estimating voltage and the state of no application are alternately repeated at regular intervals by the motor control means (coil resistance estimation means) 108. From time t1 to time t2, the target gear position is N range in the target gear position 401, and the motor for select 128 is applied with the command voltage to be driven, to hold the released state of the first speed gear. Incidentally, in description with reference to FIG. 2, using the motor for select 128, the gear change means 125 is moved from the select position B to the select position A.

From time t2 to time t3, the target gear position is the first speed gear at the target gear position 401, and the motor for shift 127 is applied with the command voltage to be driven, to make engagement with the first speed gear from N range. Incidentally, in description with reference to FIG. 2, using the motor for shift 127, the gear change means 125 is moved from the select position A to the shift position 1, thereby to engage with the first speed gear.

From time t3 to time t4, the target gear position is the first speed gear at the target gear position 401, and in the state that the first gear is engaged, the clutch is brought in engagement.

From time t4 to time t5, the target gear position is N range at the target gear position 401, and after the clutch is released, the motor for shift 127 is applied with the command voltage to be driven, to release the first speed gear. Incidentally, in description with reference to FIG. 2, using the motor for shift 127, the gear change means 125 means is moved from the shift position 1 to the select position A, thereby being released to be in N range.

From time t5 to time t6, the target gear position is the second speed gear at the target gear position 401, the motor for shift 127 is applied with the command voltage to be driven, to make engagement with the second speed gear from N range. Incidentally, in description with reference to FIG. 2, using the motor for shift 127, the gear change means 125 is moved from the select position A to the shift position 2, thereby to engage with the second speed gear.

From time t6 to time t7, the target gear position is the second speed gear at the target gear position 401, and in the state that the second speed gear is engaged, the clutch is engaged.

From time t7 to time t9, when the target gear position is the second speed gear at the target gear position 401, it is in the state that the second speed gear is engaged as well as the clutch is engaged. Incidentally, in description with reference to FIG. 2, it is the state that the gear change means 125 is at the shift position 2 and engaged with the second speed gear.

From time t9 to time t10, the target gear position is N range at the target gear position 401, and after the clutch is released, the motor for shift 127 is applied with the command voltage to be driven, to release the second speed gear. Incidentally, in descriptions with reference to FIG. 2, using the motor for shift 127, the gear change means 125 is moved from the shift position 2 to the select position A, thereby being released to be in N range.

From time t10 to time t11, the target gear position is N range at the target gear position 401, and the motor for select 128 is applied with the command voltage to be driven, to hold the released state of the third speed gear. Incidentally, in description with reference to FIG. 2, using the motor for select 128, the gear change means 125 is moved from the select position A to the select position B, to keep N range.

From time t11 to time t12, the target gear position is the third speed gear at the target gear position 401, the motor for shift 127 is applied with the command voltage to be driven, to make engagement with the third speed gear from N range. In description with reference to FIG. 2, using the motor for shift 127, the gear change means 125 is moved from the select position B to the shift position 3, thereby beginning to engage with the third speed gear.

From time t12 to time t13, the target gear position is the third speed gear at the target gear position 401, and in the state that the third speed gear is engaged, the clutch is brought in engagement.

Figure 5:
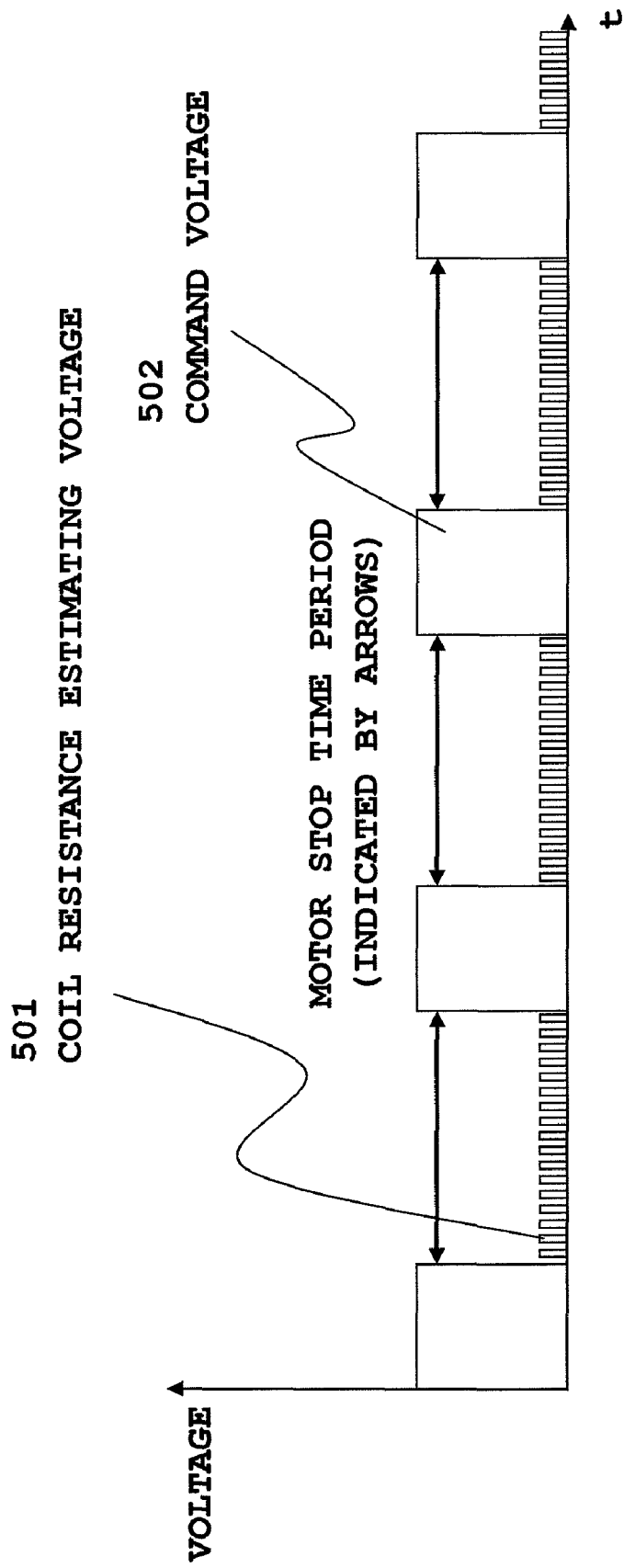
FIG. 5 is a diagram showing an application timing of a coil resistance estimating voltage.

Now, the motor control means (for coil resistance estimation) 108 illustrated in FIG. 1 is described with reference to FIG. 5. FIG. 5 is a diagram showing an application timing of a coil resistance estimating voltage. In the drawing, numeral 501 designates a coil resistance estimating voltage and numeral 502 designates a command voltage. In the case that no command voltage 502 is applied to the motor and the motor is determined stop, the mentioned coil resistance estimating voltage 501 having preliminarily been set is applied to the motor with the state of application thereof and the state of no application thereof alternately repeated at regular intervals. Incidentally, as to the application timing of the coil resistance estimating voltage at the time of gear change, this voltage is applied during a time period when the motor is stopped (refer to the portion indicated by arrows in the drawing) illustrated in the shift motor command voltage 404 and the select motor command voltage 405 of FIG. 4.

Figure 6:
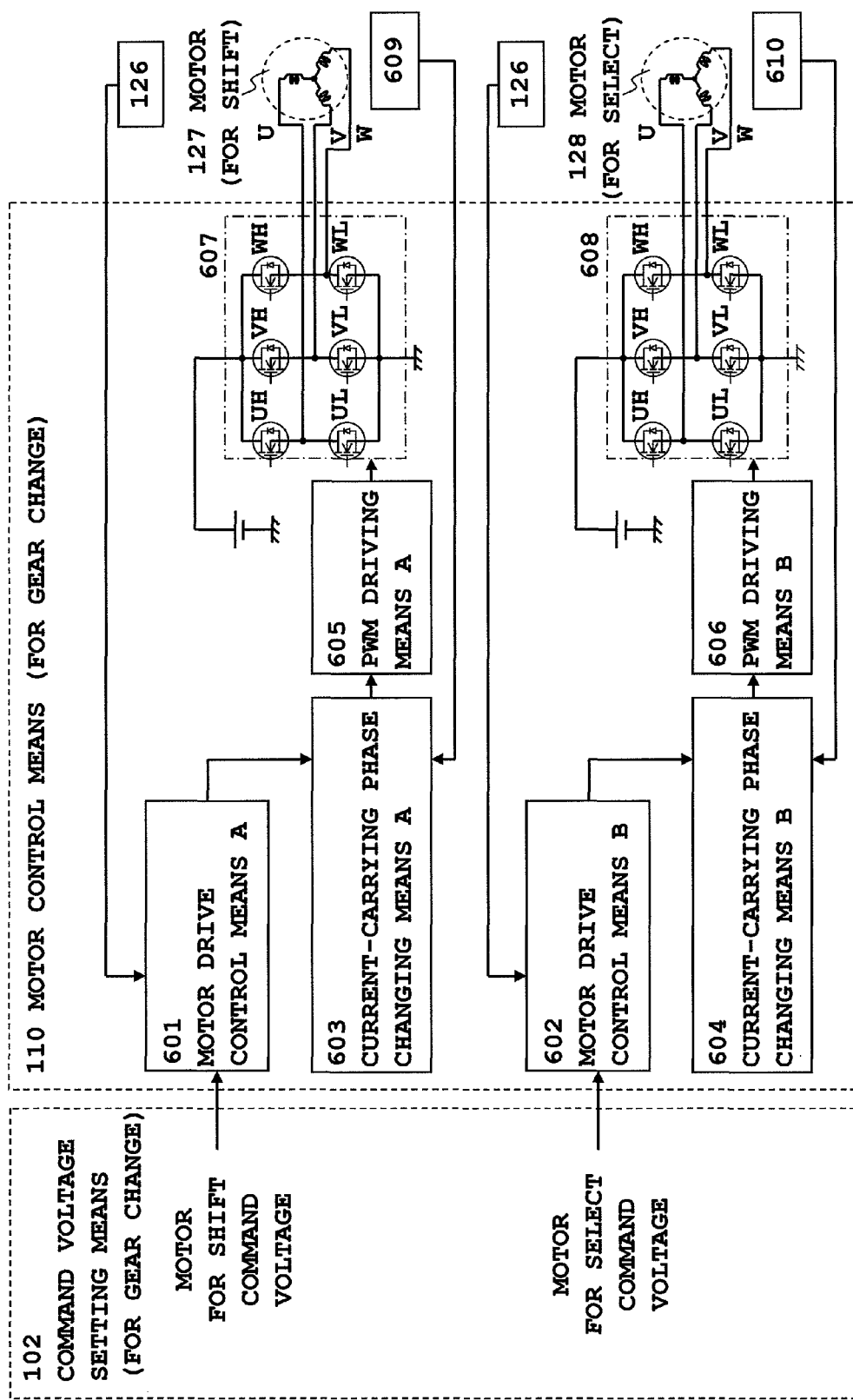
FIG. 6 is a schematic diagram showing a detailed arrangement of motor control means (for gear change) according to the first embodiment of the present invention.

Now, the motor control means (for gear change) 110 illustrated in FIG. 1 is described. FIG. 6 is a schematic diagram illustrating a detailed arrangement of the motor control means (for gear change) 110 illustrated in FIG. 1. In the drawing, numeral 601 designates motor drive control means A of controlling driving of an inverter A 607 that is made up of six EFTs of UH, VH, WH, UL, VL and WL based on the shift motor command voltage from the command voltage setting means (for gear change) 102 and the electric current that is measured at the current measurement sensor 126. Numeral 603 designates current-carrying phase changing means A to which the mentioned shift motor command voltage is commanded from the mentioned motor drive control means A, and which determines a current-carrying phase in accordance with a signal pattern of a shift-side whole sensor 609. Numeral 605 designates PWM driving means A of controlling a voltage to be applied to the motor for shift 127 by making DUTY control of FETs in the mentioned inverter A 607 based on the mentioned shift motor command voltage. As an example, in the case of making such a decision as to carry the electric current from U-phase to V-phase at the current-carrying phase changing means 603, control is made so that UH and UL are PWM-driven, and VL is ON-fixed to carry the electric current.

Numeral 602 designates motor drive control means B of controlling driving of an inverter B 608 that is made up of six FETs of UH, VH, WH, UL, VL and WL based on the select motor command voltage from the command voltage setting means (for gear change) 102 and the electric current that is measured at the current measurement sensor 126. Numeral 604 designates current-carrying phase changing means B to which the mentioned select motor command voltage is commanded from the mentioned motor drive control means B, and which determines a current-carrying phase in accordance with a signal pattern of a select-side whole sensor 610.

Numeral 606 designates motor drive control means B of controlling a voltage to be applied to the motor for select 106 by making DUTY control of FETs in the mentioned inverter B 608 based on the mentioned select motor command voltage.

Figure 7:
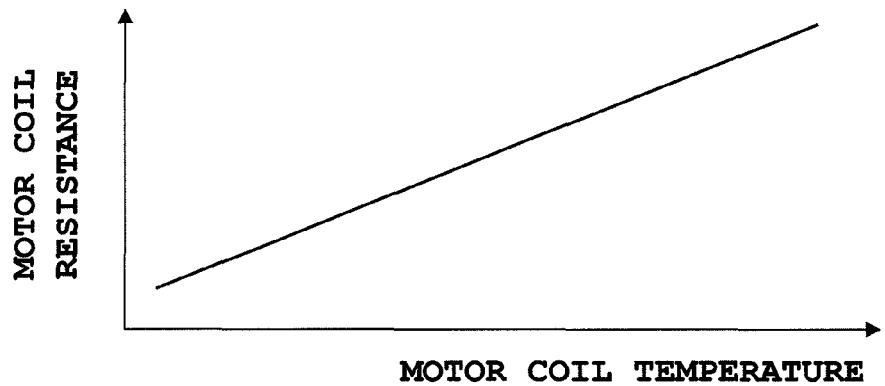
FIGS. 7(A) and (B) are diagrams explaining motor characteristics accompanied by the temperature change of a motor coil according to the first embodiment of the present invention.
Figure 7:
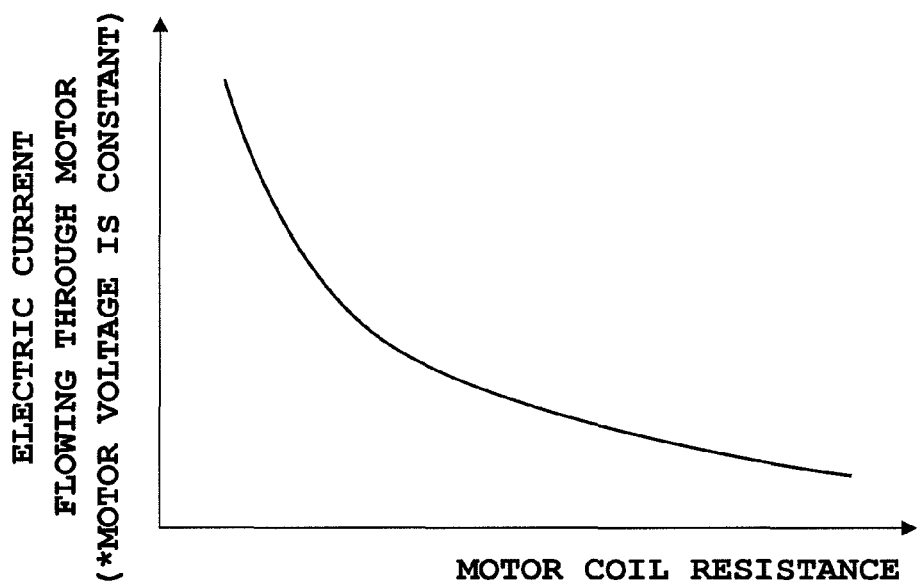

Now, characteristic change of the motor accompanied by the change in motor coil temperature is described with reference to FIG. 7. FIG. 7(A) shows motor coil temperature—motor coil resistance characteristics, and FIG. 7(B) shows motor coil resistance—motor current characteristics.

As is obvious from the relationship between a motor coil temperature and a motor coil resistance, it is known that there is correlativity between the motor coil temperature and the motor coil resistance; and the motor coil resistance is increased as the motor coil temperature rises.

As is obvious from the relationship between a motor coil resistance and a motor current, in the case of causing the voltage to be applied to the motor to be constant, it is known that there is the relationship of inverse proportion by Ohm law between the motor coil resistance and the electric current flowing through the motor. It turns out that the electric current flowing through the motor is decreased as the coil resistance of the motor rises.

Therefore, the coil resistance, supposing that the voltage across terminals of the motor and the electric current flowing through the motor are measured, can be obtained from Ohm law.

Figure 8:
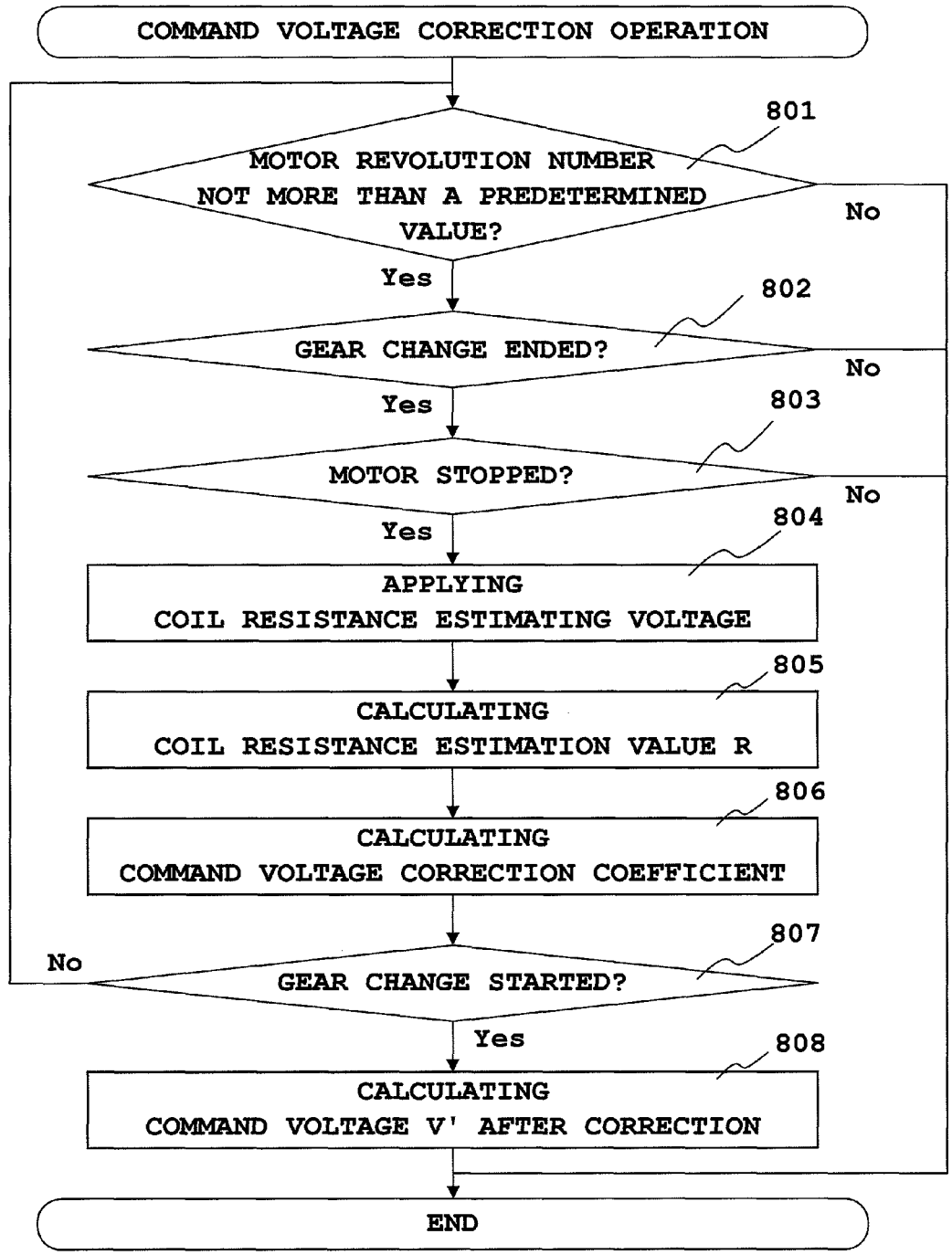
FIG. 8 is a flowchart of explaining a command voltage correction operation routine according to the first embodiment of the present invention.

Now, operations at the time of command voltage correction operation are described referring to a flowchart of FIG. 8. In Step 801, in the case that the number of revolutions of the motor is determined not more than a predetermined value, the operation goes to Step 802 of YES side; and in the case that the number of revolutions is determined not less than a predetermined value, the operation goes to No side, where a command voltage correction operation routine with changes of a coil resistance is ended.

In Step 802, in the case that there is no gear change instruction from the gear change control means 101 at the gear change end determination means 103 illustrated in FIG. 1, the gear change is determined end, to go to Step 803 on Yes side; and in the case that there is gear change instruction, the gear change is determined not end, to go to No side, where the command voltage correction routine is ended.

In Step 803, in the case that the electric current value at the motor for shift 127 or the motor for select 128 is determined not more than a predetermined value from a detected current value at the current measurement sensor 126, the motor is determined stop, to go to Step 804 on Yes side; and in the case that the electric current value at the motor for shift 127 or the motor for select 128 is determined not less than a predetermined value, the motor is determined not stop, to go to No side, where the command voltage correction operation routine is ended.

In Step 804, a coil resistance estimating voltage v to be set at the command voltage setting means (for coil resistance estimation) is applied with the state of application thereof to the motor for shift 127 or the motor for select 128 and the state of no application thereof alternately repeated at regular intervals by the motor control means 108.

In Step 805, by dividing the mentioned coil resistance estimating voltage v by a detected current value I at the current measurement sensor 126 illustrated in FIG. 1, a coil resistance estimation value R' of the motor is calculated by Ohm law. Incidentally, the coil resistance estimation value R' of the motor is operated based on the following Expression 1:

$$R'=v/I \quad \text{(Expression 1)}$$

where: I is a detected current value, v is a coil resistance estimating voltage, and R' is a coil resistance estimation value of the motor.

In Step 806, by dividing the coil resistance estimation value R' of the motor having been calculated in Step 805 by a coil resistance value (at room temperature) of the motor, a command voltage correction coefficient k is calculated. Incidentally, the mentioned after-correction command voltage correction coefficient k is operated based on the following Expression 2:

$$k=R'/R \quad \text{(Expression 2)}$$

where: k is a command voltage correction coefficient, R is a coil resistance value of the motor (at room temperature), and R' is a coil resistance estimation value (refer to the mentioned descriptions).

In Step 807, in the case that gear change instruction is present from the gear change control means 101 illustrated in FIG. 1, the operation goes to Step 808 on Yes side; and in the case of no gear change instruction, the operation goes to Step 801.

In Step 808, by multiplying the command voltage by the mentioned command voltage correction coefficient k that is calculated in the state that the coil resistance estimating voltage just before the start of gear change is applied to the motor when the motor is stopped during a predetermined time period, a command voltage after correction V taking effects of the coil temperature into consideration is calculated. Incidentally, the mentioned command voltage V is operated based on the following Expression 3. For example, a predetermined time period is to be a time period from the stopped state that the motor generates no torque to the state that the motor generates a target torque.

$$V'=K \times V \quad \text{(Expression 3)}$$

where: V' is a command voltage after correction and V is a command voltage.

Figure 11:
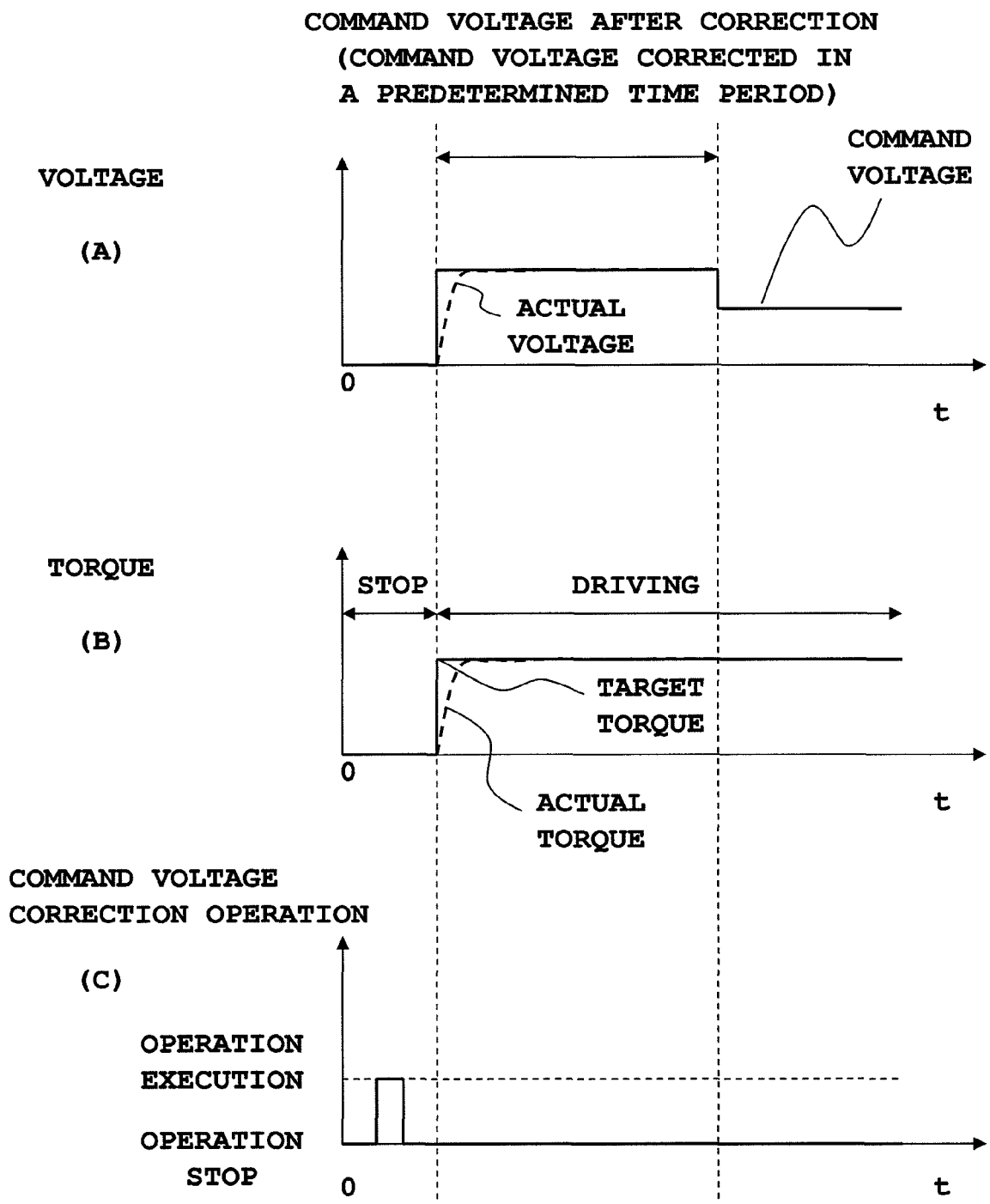
FIGS. 11 (A), (B) and (C) are diagrams showing details of command voltage correction situations to a motor by the control device of a transmission of the invention.
Figure 12:
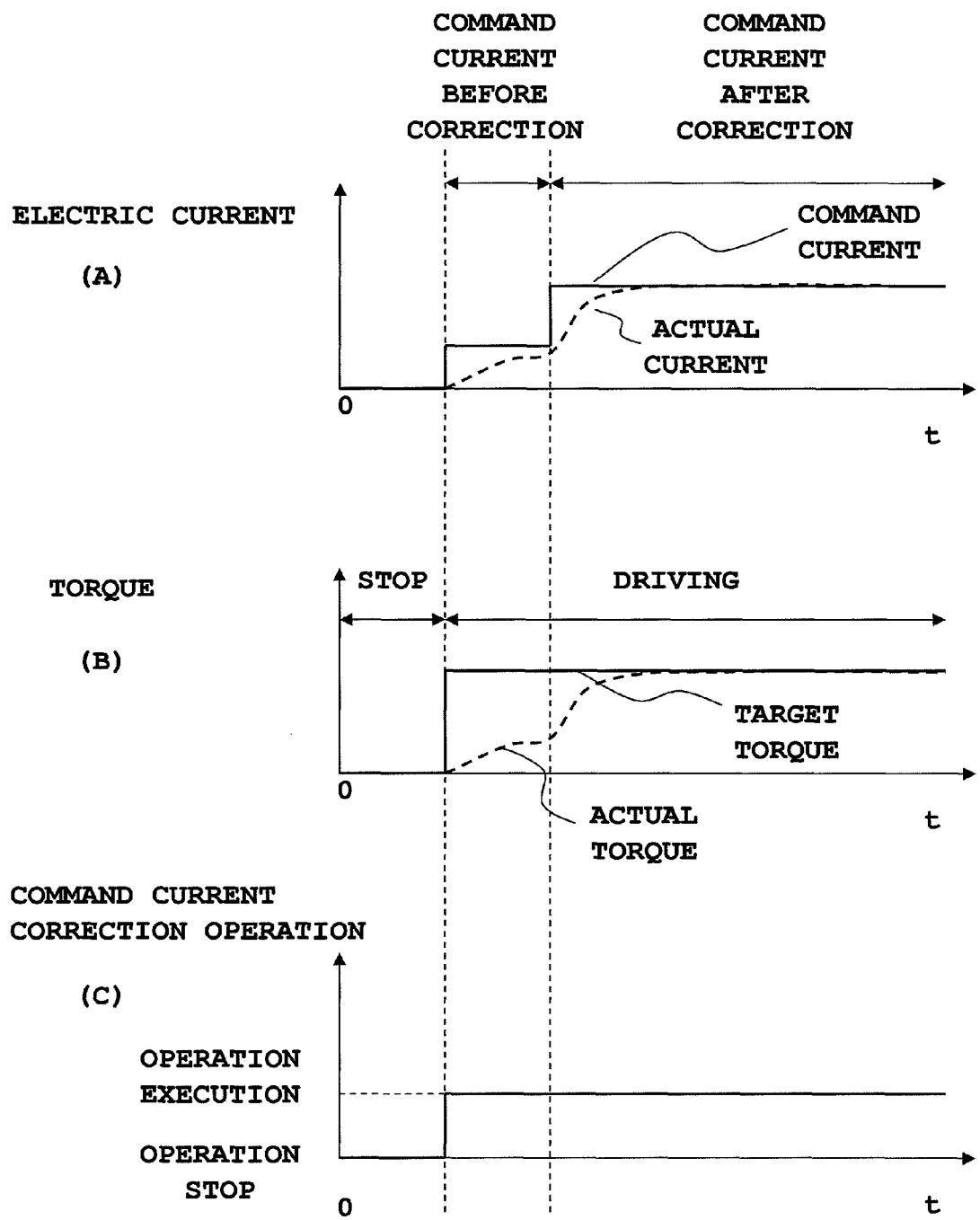
FIGS. 12(A), (B) and (C) are diagrams showing command current correction situations to a motor in the conventional control device of a transmission.

Thus, according to the first embodiment of the invention, due to that a command voltage is corrected using a coil resistance estimation value having been calculated just before starting to drive the motor, the torque shortly after the start of driving the motor can be instantaneously corrected, thus enabling to properly correct the gear operation at transient time even if the coil temperature is varied. Incidentally, FIG. 11 show details of command voltage correction situations to the motor at the time of the rise of a coil temperature when the motor is stopped. In the drawings, (A) shows the relationship between a command voltage and an actual voltage, (B) shows the relationship between a target torque and an actual torque, and (C) shows execution status of the command voltage correction operation.

A coil resistance estimation value is calculated just before starting to drive the motor is calculated, and a command voltage after correction having been calculated from the mentioned coil resistance estimation value is applied for a predetermined time period immediately after starting to drive the motor. In this case, since correction of a command voltage is exactly conducted shortly after the start of gear change, in the automatic transmission, for example, the time for the gear of the transmission to be in the connected state is shortened, and gears are exactly connected, so that worse gear change response due to the temperature rise of a coil can be suppressed.

Furthermore, due to that the coil resistance estimating voltage is applied when the motor is stopped, there is no effect of counter electromotive force to be generated in operation of the motor, or inrush current on the start of operation, so that correction of a command voltage accompanied by the change in motor temperature can be exactly conducted. Further, due to that a predetermined microvolt is applied as the coil resistance estimating voltage, the rise of a coil temperature can be prevented, as well as malfunction of the motor at the time of coil resistance estimation can be prevented.

Embodiment 2

A second embodiment of the present invention is hereinafter described with reference to FIGS. 9A, 9B, 10A and 10B.

In the control of a motor according to the second embodiment of the present invention, only the interval of applying a coil resistance estimating voltage of Step 804 in the command voltage correction operation routine illustrated in FIG. 8 of the first embodiment is different, and therefore only this different arrangement is described.

Figure 9A:
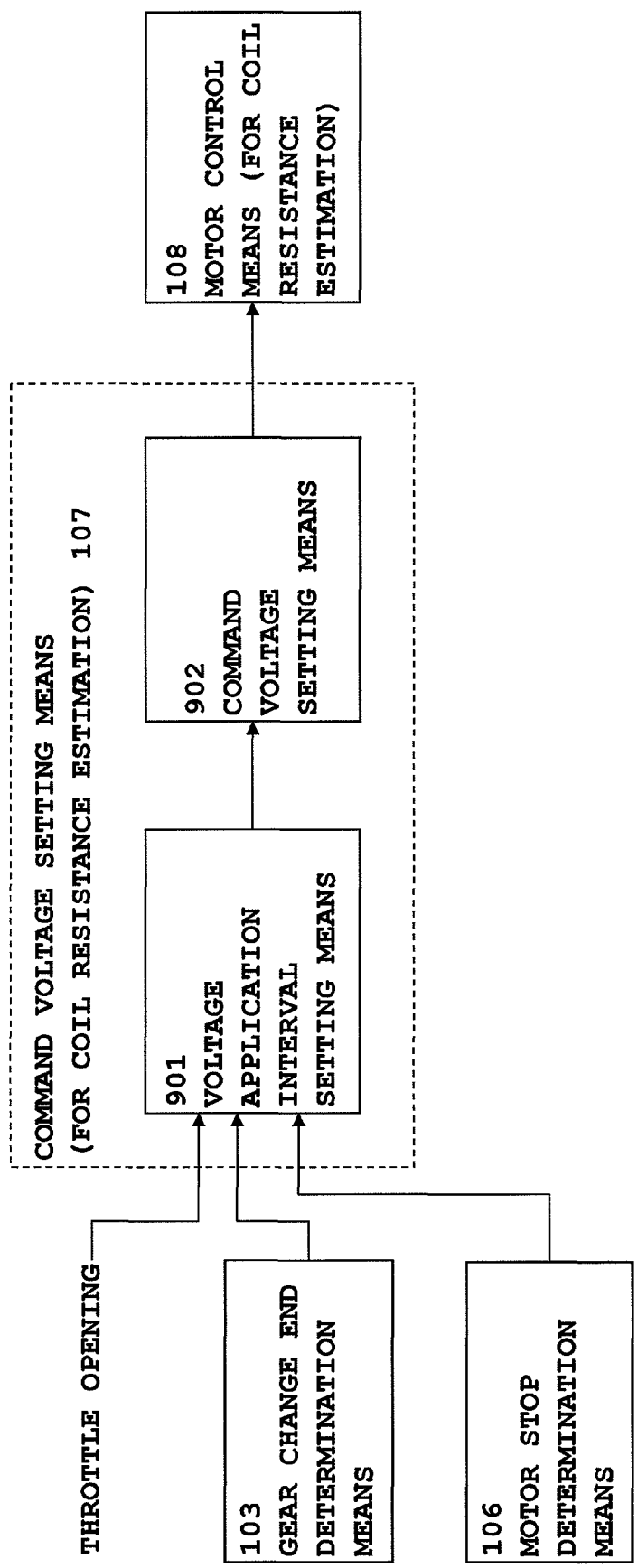
FIG. 9A is a detailed diagram of command voltage setting means (for coil resistance estimation) illustrated in FIG. 1.
Figure 9B:
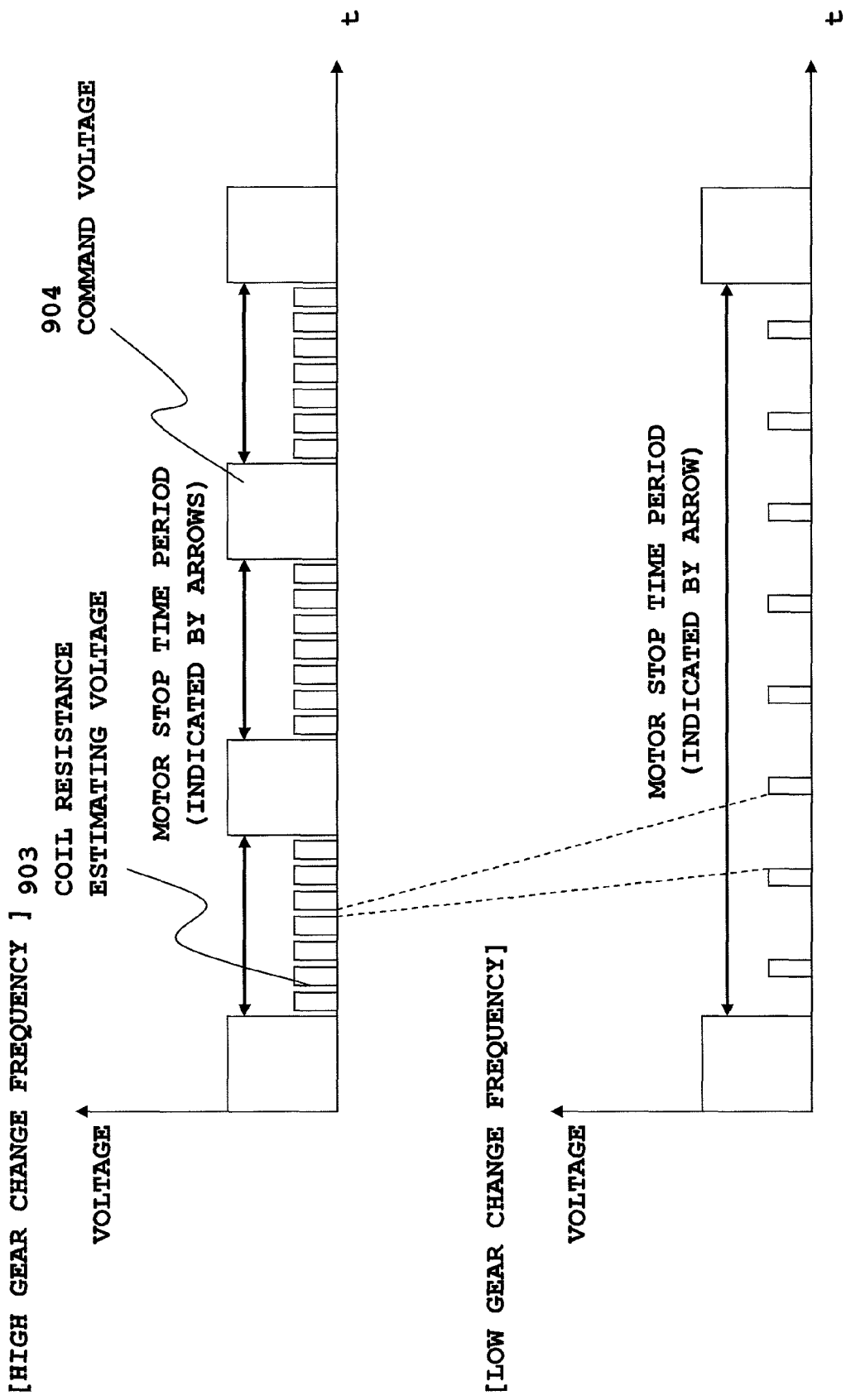
FIG. 9B is a diagram showing a mechanism of setting a voltage application interval in accordance with a gear change frequency.

FIG. 9A is a detailed diagram of command voltage setting means (for coil resistance estimation) illustrated in FIG. 1. FIG. 9B shows a mechanism of setting a voltage application interval in accordance with gear change frequency. In the case that by the gear change end determination means 103 and the motor stop determination means 106 illustrated in FIG. 1, the motor is determined stop, the command voltage setting means (for coil resistance estimation) 107 commands the coil resistance estimating voltage to the motor control means (for coil resistance estimation) 108, and the mentioned coil resistance estimating voltage is applied with the state of application thereof and the state of no application thereof alternately repeated at regular intervals from the mentioned motor control means (for coil resistance estimation) 108 to the motor for shift 127 and the motor for select 128. In the drawing, numeral 901 designates voltage application interval setting means of setting an application interval of the coil resistance estimating voltage depending on information of an operation state of a vehicle, for example, a throttle opening in the case that the motor is determined stop. Further, numeral 902 designates command voltage setting means of setting the coil resistance estimating voltage having preliminarily been set for application thereof to the motor using the mentioned motor control means (for coil resistance estimation) 108.

Numeral 903 illustrated in FIG. 9B is the mentioned coil resistance estimating voltage. The mentioned coil resistance estimating voltage 903, during a time period when no command voltage 904 is applied and the motor is stopped, is applied to the motor for shift 127 or the motor for select 128 with the state of application and the state of no application alternately repeated at regular intervals. In addition, as to the voltage application interval of the mentioned coil resistance estimating voltage 903, in the case that the change of a throttle opening is not less than a predetermined value, the gear change operation is determined increase, and thus the application interval of the voltage is shortened; and in the case that the change of a throttle opening is not more than a predetermined value, a vehicle travels at a constant speed and a few gear change operations are determined, and thus the application interval of the voltage is made longer.

Figure 10A:
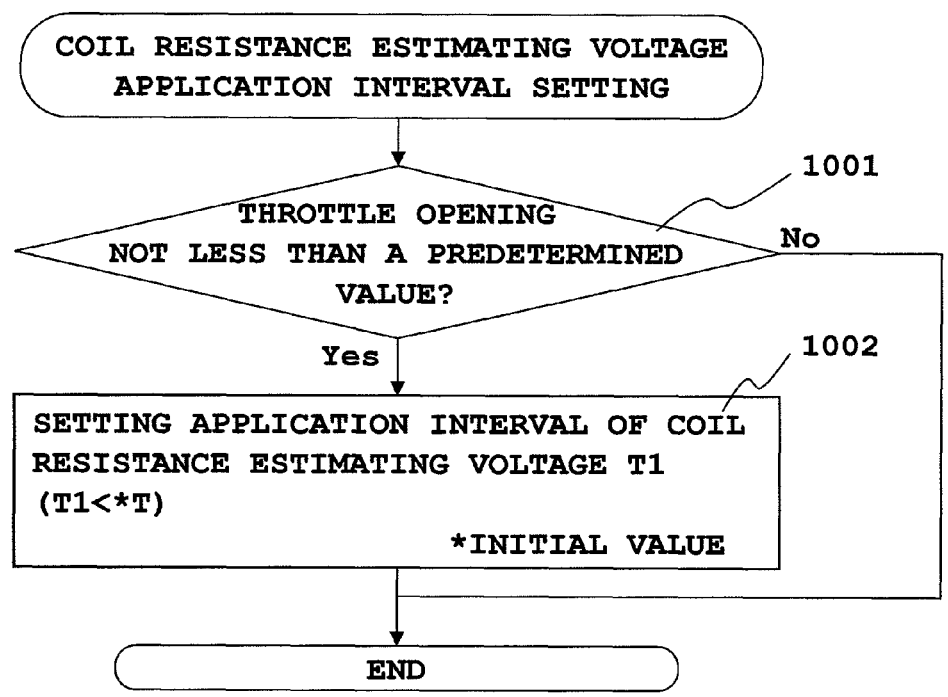
FIG. 10A is a flowchart showing a coil resistance estimating command voltage application interval setting routine.

Now, a brief description of the change of application interval of the coil resistance estimating voltage are described with reference to FIG. 10A. FIG. 10A is a flowchart of showing the flow of this embodiment. This flowchart shows details of voltage application interval setting means 901 of FIG. 9A. This voltage application interval setting means 901 operates during a time period when the motor is stopped, and calculates the application interval of the coil resistance estimating voltage.

In Step 1001, in the case that the throttle opening is determined not less than a predetermined value, the operation goes to Step 1002 on Yes side; and in the case that the throttle opening is determined not more than a predetermined value, the operation goes to END on No side, where the application interval of the coil resistance estimating command voltage is kept to be an initial value T having preliminarily been set.

In Step 1002, since the gear change frequency is estimated to be high due to that the throttle opening is not less than a predetermined value, the mentioned initial value T is changed to be a predetermined value T1 having preliminarily been set. Incidentally, the mentioned predetermined value T1 is to be a time period shorter than the mentioned initial value T.

Furthermore, the change of the application interval of the coil resistance estimating voltage, not limiting to the throttle opening, can be made in accordance with the traveling state of the vehicle.

Figure 10B:
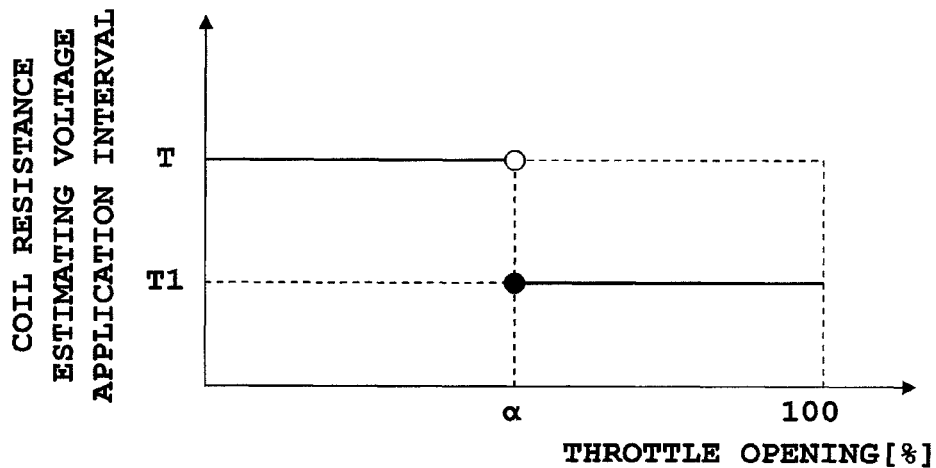
FIG. 10B is a chart showing details of a throttle opening—a coil resistance estimating voltage application interval.

FIG. 10B shows details of a throttle opening—a coil resistance estimating voltage application interval. In the drawing, the relationship between the throttle opening and the interval of applying the coil resistance estimating voltage is shown. When the throttle opening is less than a predetermined value $\alpha$, the coil resistance estimating voltage application interval is set to T; and when it is not less than a predetermined value $\alpha$, the coil resistance estimating voltage application interval is set to T1. For example, when the throttle opening is less than a predetermined value $\alpha$, the gear change operation is determined decrease, and the application interval initial value T of the coil resistance estimating voltage is to be 1 sec; and when the throttle opening is not less than a predetermined value $\alpha$, the gear change operation is determined increase, and the application interval T1 of the coil resistance estimating voltage is to be 100 msec.

Consequently, according to the second embodiment of the present invention, at the time of coil resistance estimation, as to the coil resistance estimating voltage, the voltage application interval is shortened in accordance with the operation state. Thus, for example, in the case that the gear change frequency is high, based on the correction coefficient having been calculated just before gear change, highly accurate correction of the command voltage can be conducted shortly after starting to drive. On the other hand, in the case that the gear change frequency is low, the voltage application interval is made longer, the power consumption in coil resistance estimation can be reduced, as well as the temperature rise of a coil can be prevented. In this manner, for example, since the gear change frequency is low at the time of normal traveling, the voltage application interval is made longer, while since the gear change frequency is high at the time of traveling with the throttle fully open, the voltage application interval is shortened. As a result, the gear change response is improved, as well as the power consumption is decreased by the change of voltage application interval in accordance with the traveling state.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A control device of an automatic transmission, including an automatic transmission having a clutch for transmitting a power from an engine to a gear change mechanism part, gear change control unit that controls a gear change of said automatic transmission, and a motor that changes a gear range of said automatic transmission based on a gear change command from said gear change control unit, the control device of an automatic transmission comprising:

a gear change end determination unit that determines that a gear change of said automatic transmission is ended;

a motor stop determination unit that determines that said motor is stopped; and a coil resistance estimation unit that estimates a coil resistance of said motor in which a state of application of a predetermined voltage to the motor during a stopped state before the start of the gear change and a state of no application thereof are alternately repeated at regular intervals, wherein in the case that the motor is determined to be stopped by said gear change end determination unit and said motor stop determination unit, during the stoppage of the motor before the start of a gear change, an initial value of a command voltage to be applied to said motor after the start of the gear change is corrected in a predetermined time period in accordance with a coil resistance value having been calculated by said coil resistance estimation unit.

2. The control device of an automatic transmission according to claim 1, further comprising a motor revolution number measurement unit that measures the number of revolution of said motor and a motor current measurement unit that measures an electric current of said motor; wherein in the case that the number of revolutions that is detected by said motor revolution number measurement unit is not more than a predetermined value and that a current detected value at said motor current measurement unit is not more than a predetermined value, said motor stop determination unit determines that said motor is stopped.

3. The control device of an automatic transmission according to claim 1, wherein said coil resistance estimation unit comprises:

a coil resistance estimating command voltage setting unit that sets a coil resistance estimating voltage in the case of obtaining a determination result that the gear change is ended and the motor is stopped from said gear change end determination unit and said motor stop determination unit; a motor control unit applying the coil resistance estimating voltage having been set at said command voltage setting means to said motor; a command voltage correction coefficient calculation unit that calculates a coil resistance estimation value in accordance with a coil resistance estimating voltage having been set at said command voltage setting unit and said motor current having been measured at said current measurement device at the time of application of said coil resistance estimating voltage, and calculating a command voltage correction coefficient in accordance with a coil resistance value at room temperature having preliminarily been set and said coil resistance estimation value; and gear change command voltage setting unit that calculates a command voltage after correction in accordance with changes of the coil resistance value due to change in coil temperature by multiplying a command voltage having been lead based on a gear change instruction from said gear change control unit by a command voltage correction coefficient having been calculated by said command voltage correction coefficient calculation unit.

4. The control device of an automatic transmission according to claim 3, wherein said coil resistance estimating command voltage setting unit comprises a voltage application interval setting unit that sets an application interval of a coil resistance estimating voltage depending on information of an operation state of a vehicle in the case that the motor is determined stop, and a command voltage setting unit that sets a coil resistance estimating voltage having preliminarily been set for application thereof to the motor.

5. The control device of an automatic transmission according to claim 4, wherein a throttle opening information is used as information of the operation state of a vehicle; and an application interval is shortened in the case that a throttle opening change is not less than a predetermined value, and an application interval of a voltage is made longer in the case that a throttle opening change is not more than a predetermined value.

6. The control device of an automatic transmission according to claim 1, wherein said coil resistance estimation unit alternately repeats at regular intervals a state of application of said predetermined voltage and a state of no application thereof when the motor is determined stop by said motor stop determination unit and until the start of gear change is determined, and changes an interval of applying said coil resistance estimating voltage depending on a gear change frequency of a gear to estimate a coil resistance.

* * * * *